United States Patent [19]

Sivarajan et al.

[11] Patent Number: 5,233,453
[45] Date of Patent: Aug. 3, 1993

[54] SPACE-DIVISION SWITCHED WAVEGUIDE ARRAY FILTER AND METHOD USING SAME

[75] Inventors: Kumar N. Sivarajan, Croton-on-Hudson, N.Y.; David G. Steinberg; Franklin F. Tong, both of Stamford, Conn.

[73] Assignee: International Business Machines Corporation, Armonk, N.Y.

[21] Appl. No.: 875,493

[22] Filed: Apr. 29, 1992

[51] Int. Cl.[5] .......................... G02F 1/00; G02B 6/28
[52] U.S. Cl. .................................. 359/117; 359/333; 359/128; 359/131; 385/14; 385/16; 385/24; 385/45; 385/130; 385/132
[58] Field of Search ................. 385/14, 15, 16, 24, 385/31, 33, 45, 40, 49, 130, 131, 132; 372/6; 359/117, 333, 139, 128, 131

[56] References Cited

U.S. PATENT DOCUMENTS

| | | | |
|---|---|---|---|
| 4,818,050 | 4/1989 | Duthie | 385/132 |
| 4,845,703 | 7/1989 | Suzuki | 359/128 |
| 4,932,742 | 6/1990 | Tohme | 385/33 |
| 5,009,477 | 4/1991 | Alferness et al. | 385/17 X |
| 5,048,909 | 9/1991 | Henry et al. | 385/45 X |
| 5,093,876 | 3/1992 | Henry et al. | 385/45 X |
| 5,134,672 | 7/1992 | Imoto et al. | 385/16 |
| 5,136,670 | 8/1992 | Shigematsu et al. | 385/42 |
| 5,146,513 | 9/1992 | Inoue et al. | 385/16 X |
| 5,175,777 | 12/1992 | Böttle | 385/17 |
| 5,177,804 | 1/1993 | Shimizu et al. | 385/16 X |

*Primary Examiner*—Brian Healy
*Attorney, Agent, or Firm*—Douglas W. Cameron

[57] ABSTRACT

This invention discloses a method and apparatus for providing high speed optical tuning. With this invention, light is spatially routed through a tree of optical switches interconnected by waveguides to a selected fixed tuned optical filter in an array of such filters. Each of the optical switches can be controlled by a binary signal thereby permitting digitally controlled optical filtering.

9 Claims, 10 Drawing Sheets

SPACE-DIVISION SWITCHED WAVEGUIDE ARRAY FILTER AND METHOD USING SAME

DESCRIPTION

Technical Field

This invention relates to a method and apparatus for providing high-speed optical tuning.

BACKGROUND OF THE INVENTION

A low-cost, high-speed, tunable optical filter with a wide tuning range and narrow band-width is required for high performance wavelength division multiplexed optical communication networks (N. Dono, P.E. Green, K. Liu, R. Ramaswami and F. Tong in *IEEE Journal of Selected Areas in Communication*, vol. 8 pp. 983-995, 1990). For such applications, the filter requirements are: optical bandwidth (>30 nm), tuning speed (<1 μs), polarization insensitivity, compactness (≃ few cm), low loss, low crosstalk and low cost. Of equal importance is the filter control; it should be digital and not require elaborate stabilization schemes. For a review of current tunable optical filter technology, see Kobrinski et al, *IEEE Communication Magazine*, pp. 53-63, 1989.

One of the more promising filtering schemes is to combine acousto-optical deflection and cascaded crossed wedge etalons, as proposed by F. Tong, D.F. Bowen and P.A. Humblet (*European Conference on Optical Communication Digest*, p. 61, 1991). Briefly, the incident beam that carries all the wavelengths is deflected by a dual-axis or two single-axis acousto-optical deflectors and is focussed onto a cascaded wedge etalon assembly. The direction of increasing wedge thickness of the first etalon is approximately 90° to that of the second. The thickness of the first etalons is chosen such that it is ≃10 times that of the second, thus generating a coarse-fine cascaded filter. The incident beam can be deflected to any point on the crossed wedge etalon assembly; at each point a particular wavelength is selected. Such a filter has been demonstrated to support ≃600 equally spaced channels over a range of 60 nm centered at 1.55 μm. The channel access time was ≃2 μs. The disadvantages of the device, however, are its large dimensions (≃1.5 m in length) and the fact that it cannot be mass-produced in a low cost compact form. Thus, it is not an attractive solution for computer communication applications.

There are three issues that place a lower limit on the dimensions of a crossed wedge etalon filter. First, the beam spot diameter at the etalons should be about 500 μm to avoid diffraction. Second, locations on the etalons corresponding to neighboring channels must be separated by about 4 times the spot diameter to suppress crosstalk. These 2 issues lead to a minimum etalon lateral dimension of 6 cm for a 32×32 channel filter. Third, the length of the device is limited by the maximum deflection angle (≃3°) of the acousto-optical deflector. The length could be reduced by means of telescopic lenses or mirrors but the filter would still remain large in the lateral dimension.

The above problems can be solved by using guided wave optics, rather than free space optics to avoid diffraction and crosstalk, and optical switches to spatially route the signals to avoid the difficulties associated with the acousto-optic deflector.

The invention herein uses a tree of optical switches to direct light onto an array of fixed tuned filters. Light is spatially routed through the tree by controlling the states of the switches such that all of the input light is routed into the particular array element which selects the desired wavelength. The outputs of the fixed tuned filters can be connected directly to photo-detectors, or if desired, the optical outputs can be coupled into a single optical output by traversing a similar tree of optical switches, but in reverse order.

Various materials and physical effects have been used to produce optical waveguides and switches for the 1.55 μm optical band. In particular, field-effect and carrier-effect switches have been widely investigated.

Field effect optical switches have been fabricated in $LiNbO_3$, $LiTaO_3$, AlGaAs, GaInAsP, and organic polymers. A 16×16 $LiNbO_3$ directional coupler switch array was discussed by P.J. Duthie and M.J. Wale in *Electronics Letters*, vol. 27, no. 14 pp. 1265-1266, 1991. A polarization independent $LiNbO_3$ 8×8 matrix switch was reported by H. Nishinoto, M. Iwasaki, S. Suzuki and M. Kondo in *IEEE Photonics Technology Letters* vol. 2 no. 9 pp. 634-636, 1990. A 4×4 GaAs/AlGaAs electro-optical matrix switch based on directional couplers was published by K. Komatsu, K. Hamamoto, M. Sugimoto, A. Ajisawa, Y. Kohga and A. Suzuki in *IEEE Journal of Lightwave Technology*, vol. 9, no. 7, pp. 871-878, 1991. A 2×2 X-type intersectional switch using multiple-quantum well GaInAsP structures on an InP substrate was demonstrated by K.G. Ravikumar, K.Shimomura, T. Kikugawa, A. Izumi, S. Arai, Y. Suematsu and K. Matsubara in *Electronics Letters* vol. 24, no. 7, pp. 415-416, 1988. Directional coupler switches made from electro-optically active organic polymers have been reported by E. Van Tomme, P. Van Daele, R. Baets, G.R. Mohlmann and M.B.J. Diemeer in *Journal of Applied Physics*, 69 (9), pp. 6273-6276, 1991.

For carrier-effect devices, X- and Y-junction optical switch structures have been fabricated on semiconductor substrates. A 4×4 optical switch with a total of 16 switching stages was fabricated using GaInAsP on an InP substrate with X-crossing and Y-branching structures. This was reported by H. Inoue, H. Nakamura, K. Morosawa, Y. Sasaki, T. Katsuyama and N. Chinone in *IEEE Journal of Selected Areas in Communications* vol. 6, no. 7 pp. 1262-1266, 1988. Amplifying sections were added in their later communication which appeared in *IEEE Photonics Technology Letters* vol. 2 no. 3, 1990. An X-intersectional optical switch was built and reported by K. Wakao, K. Nakai, M. Kuno and S. Yamakoshi in *IEEE Journal in Selected Areas in Communications* vol. 6, no. 7 pp. 1119-1204, 1988. A Y-junction optical switch was fabricated and reported by H. Yanagawa, K. Ueki and Y. Kamata in *IEEE Journal of Lightwave Technology* vol. 8 no. 8 pp. 1192-1197, 1990.

A variety of fixed tuned waveguide filters have been studied and are relevant to our invention. An array of 8 InGaAsP/InP Bragg grating filters, each with a passband of 2 nm and channel spacing of 5.7 nm, has been built and reported by C. Cremer, G. Heise, R. Marz, M. Schienle, G. Schulte-Roth and H. Unzetig in *IEEE Journal of Lightwave Technology* vol. 7, no. 11, pp. 1641-1645, 1989. A meander waveguide InGaAsP/InP filter of 16 nm passband has been fabricated and reported by C. Bornholdt, F. Kappe, R. Muller, N.-P. Nolting, F. Reier, R. Stenzel, H. Venghaus and C.M. Weinert in *Applied Physics Letters*, vol. 57, no. 24, pp. 2517-2519, 1990. A 40-channel channel dropping filter array, each with a passband of 10 GHz and a separation of 50 GHz, was proposed by H. Haus and Y. Lai in *IEEE Journal of Lightwave Technology* vol. 10, no. 1 pp. 57-61, 1992. The above three filter types do not have an amplitude response which is periodic in wavelength. Hence, they cannot be cascaded in a coarse/fine or vernier arrangement as will be explained below.

Since the Fabry-Perot filter does have a periodic response, it was chosen for the preferred embodiment of this invention.

U.S. Pat. No. 5,049,169 to Guerin et al. discloses a tree structure arrangement of optical filters but does not employ space division optical routing as described in the invention of this application.

SUMMARY OF THE INVENTION

It is therefore an object of this invention to provide a high resolution and rapidly tunable optical filter with a wide tuning range. It is a further object of this invention to provide a low-cost optical filter which can be produced in low-cost compact form by lithographic methods.

Accordingly, this invention provides a tunable optical filter which comprises an array of fixed tuned optical filters and a number of optical switches interconnected by waveguides for spatially directing an optical beam to a selected filter in the array.

More specifically the optical switches can be arranged in a tree structure with each switch being responsive to a binary signal for spatially directing the optical beam to one of the two outputs of each switch. The optical beam is thereby spatially routed through the tree structure to a particular fixed tuned filter in the array so as to obtain a desired optical wavelength at the output of the selected filter.

DESCRIPTION OF THE PREFERRED EMBODIMENT

Figure 1A:
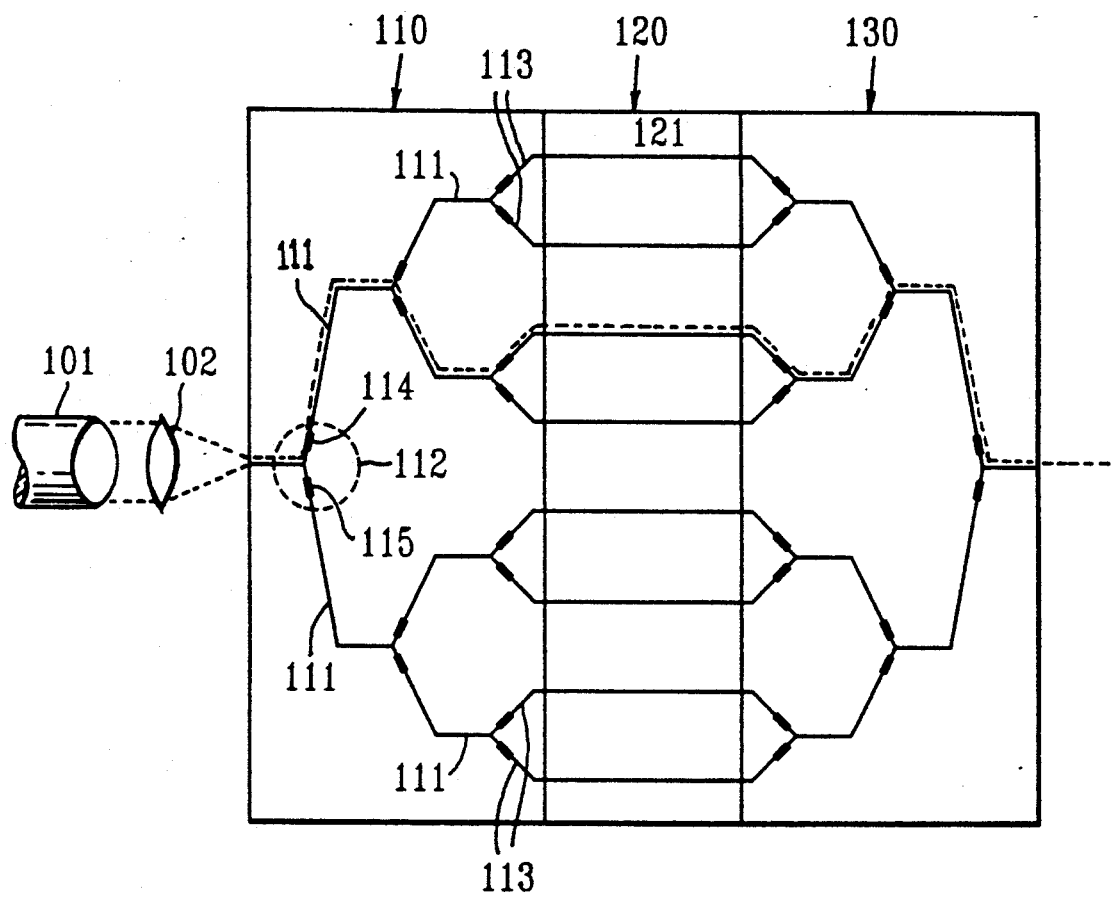
FIG. 1(a) schematically illustrates the tunable optical filter of this invention using a reverse tree of optical switches coupled to the array of fixed tuned filters.

The preferred embodiment of this invention is a tunable optical filter as illustrated in FIG. 1(a). The device is fabricated on an InGaAsP/InP substrate. Incoming light from an optical fiber 101 is coupled by means of a lens 102 into a waveguide 111 at the root of a tree of optical switches.

Figure 3A:
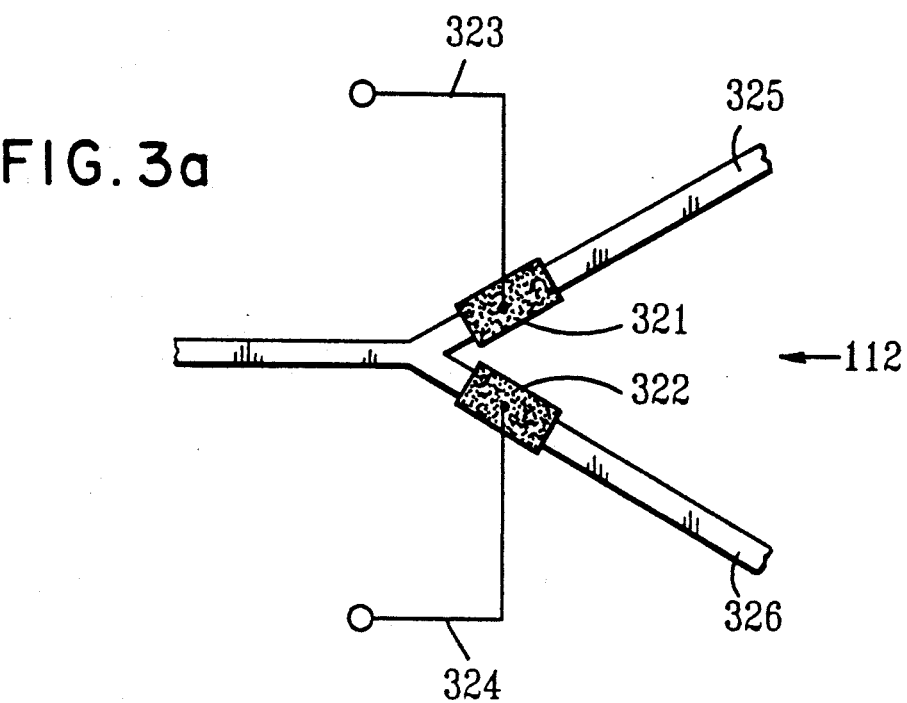
FIG. 3(a) schematically illustrates the Y-junction optical switch used in this invention.

Waveguide 111 is then coupled to a Y-junction optical switch 112; the details of this switch are shown in FIG. 3(a). The switch is controlled by the currents applied to electrodes 321 and 322 on its outgoing branches, and it is essentially a binary device: either all the light is routed to the upper output 325 or the lower output 326. The switch is controlled by a binary signal; one state of the signal causes current to be injected into electrode 321 by means of wire 323 and the other state of the signal causes current to be injected into electrode 322.

Figure 1B:
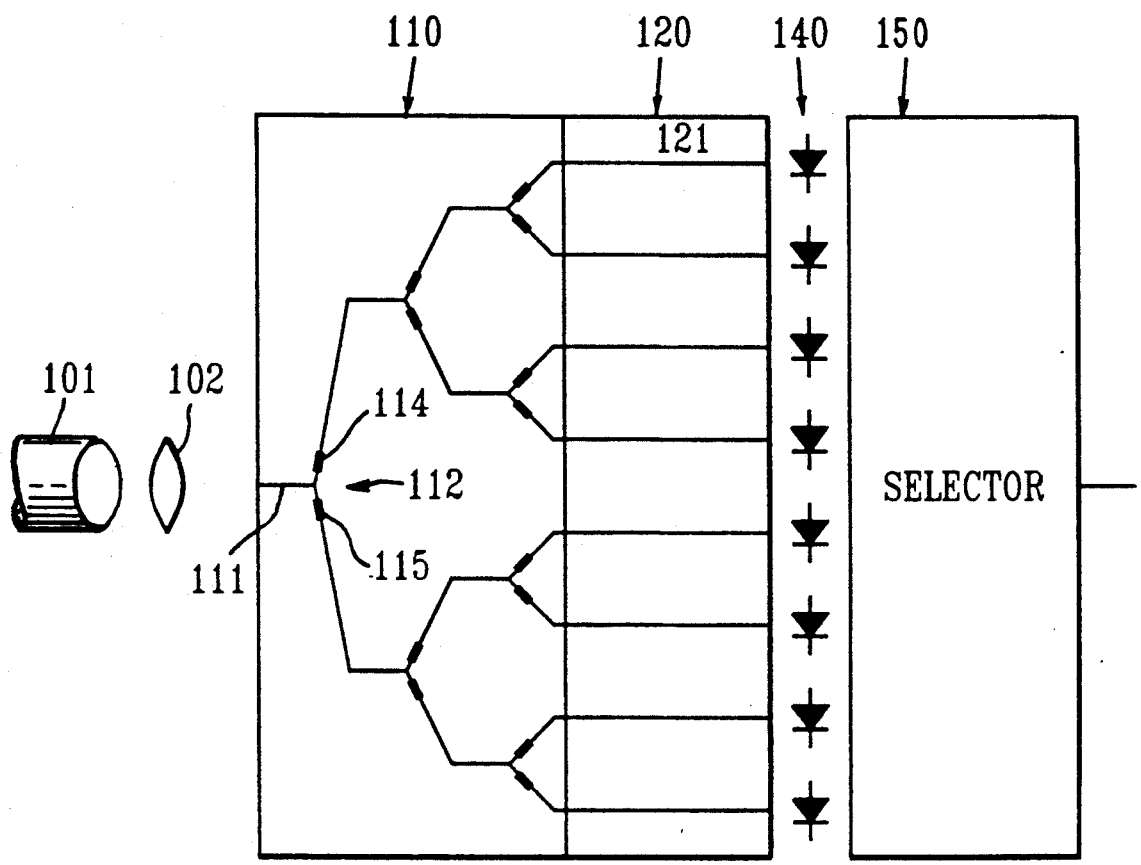
FIG. 1(b) schematically illustrates a tunable optical filter of this invention using an array of photodetectors coupled to the array of fixed tuned filters.
Figure 1C:
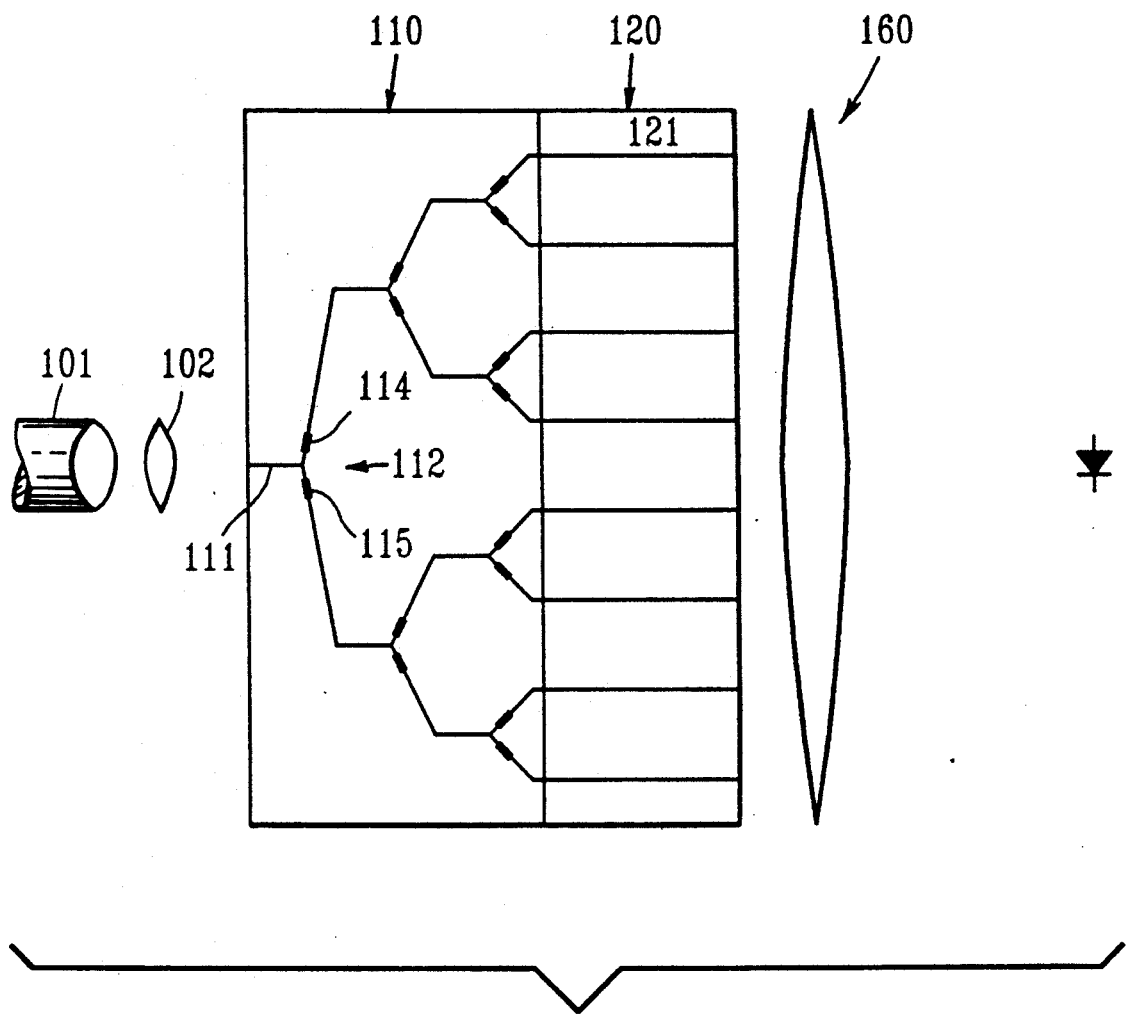
FIG. 1(c) schematically illustrates a tunable optical filter of this invention using a lens to focus the light to a photodetector.

The light is then routed through subsequent switches and the interconnecting waveguides in a similar fashion so that all the incoming light is guided through the tree to any one of its leaves 113. The leaves of the tree are coupled into an array 120 of fixed tuned filters, for example Fabry-Perot filters. Each Fabry-Perot filter 121 is resonant at a unique wavelength $\lambda_i$. Thus, spacing division switching in the tree combined with wavelength selection in the fixed-tuned filter array results in a unique wavelength of light being selected. This selected wavelength is inputted into a reverse tree 130 of optical switches. The switches in the reverse tree 130 are set identically to those in tree 110 so that the light emanating from the selected Fabry-Perot filter is routed to the output of 130. The dotted line in FIG. 1(a) illustrates a typical routing of an optical beam from the input to the output of the tunable filter. As an alternative to the preferred embodiment, reverse tree 130 can be replaced by an array of photodetectors 140 as in FIG. 1(b). The electrical outputs of the detectors can then be selected using an electronic selector 150. This is shown in FIG. 1(b). As another alternative to the preferred embodiment, 130 can be replaced by a lens 160 which focuses the light into a single optical output as shown in FIG. 1(c).

Figure 2A:
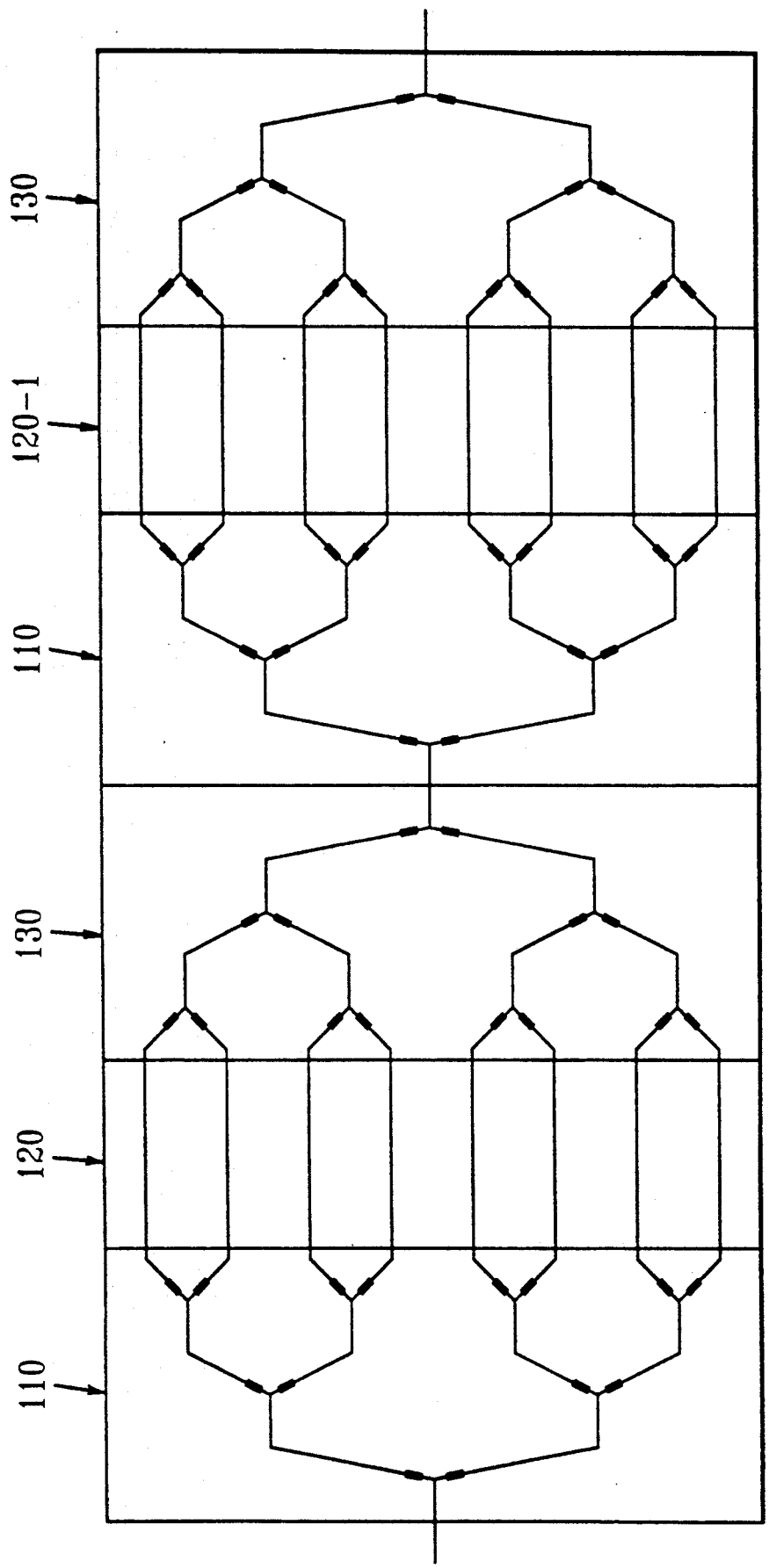
FIG. 2(a) schematically illustrates a cascaded arrangement of tunable optical filters.
Figure 2B:
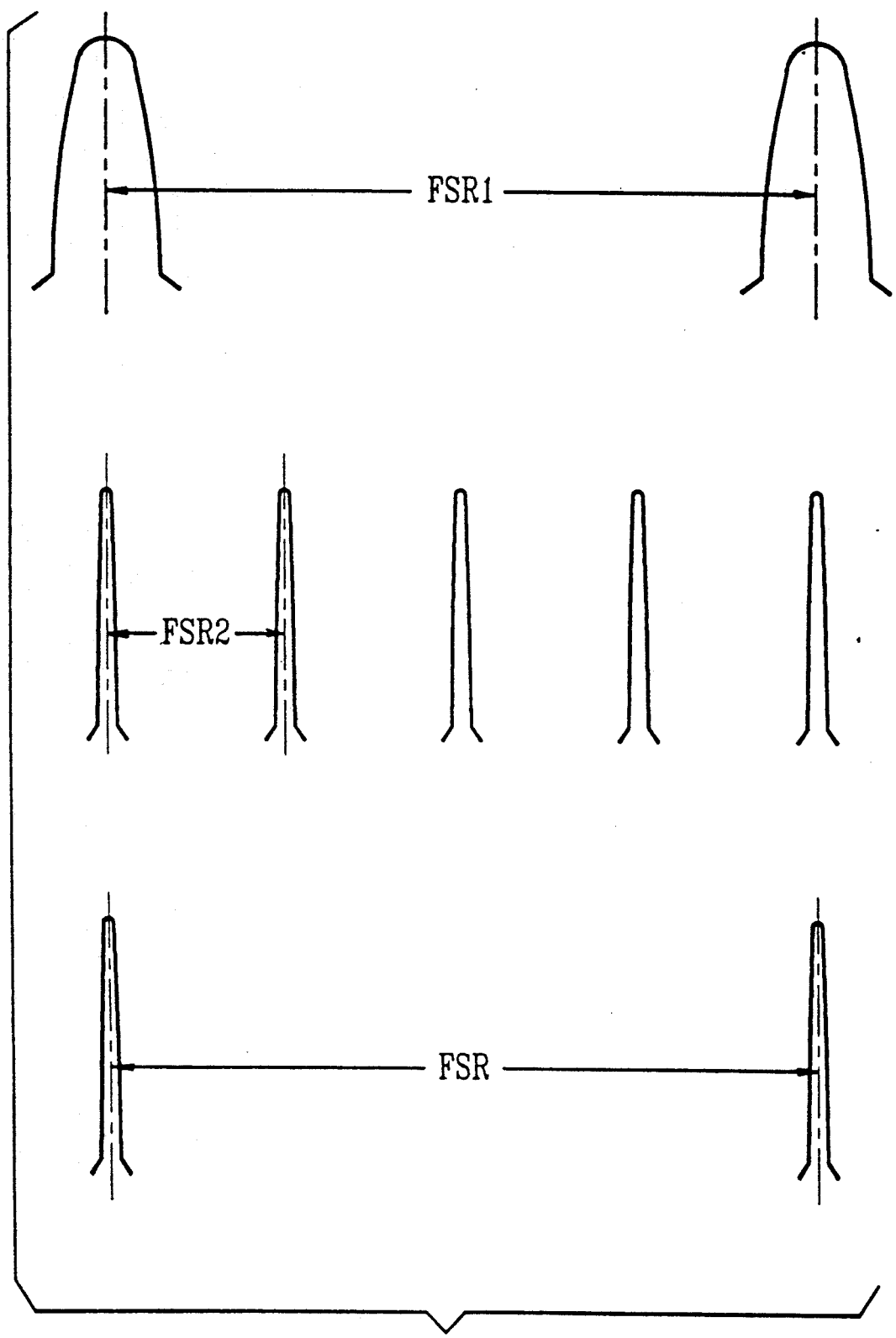
FIG. 2(b) schematically illustrates the frequency responses of the coarse and fine filters, and of the cascade in a cascaded coarse-fine filter.
Figure 2C:
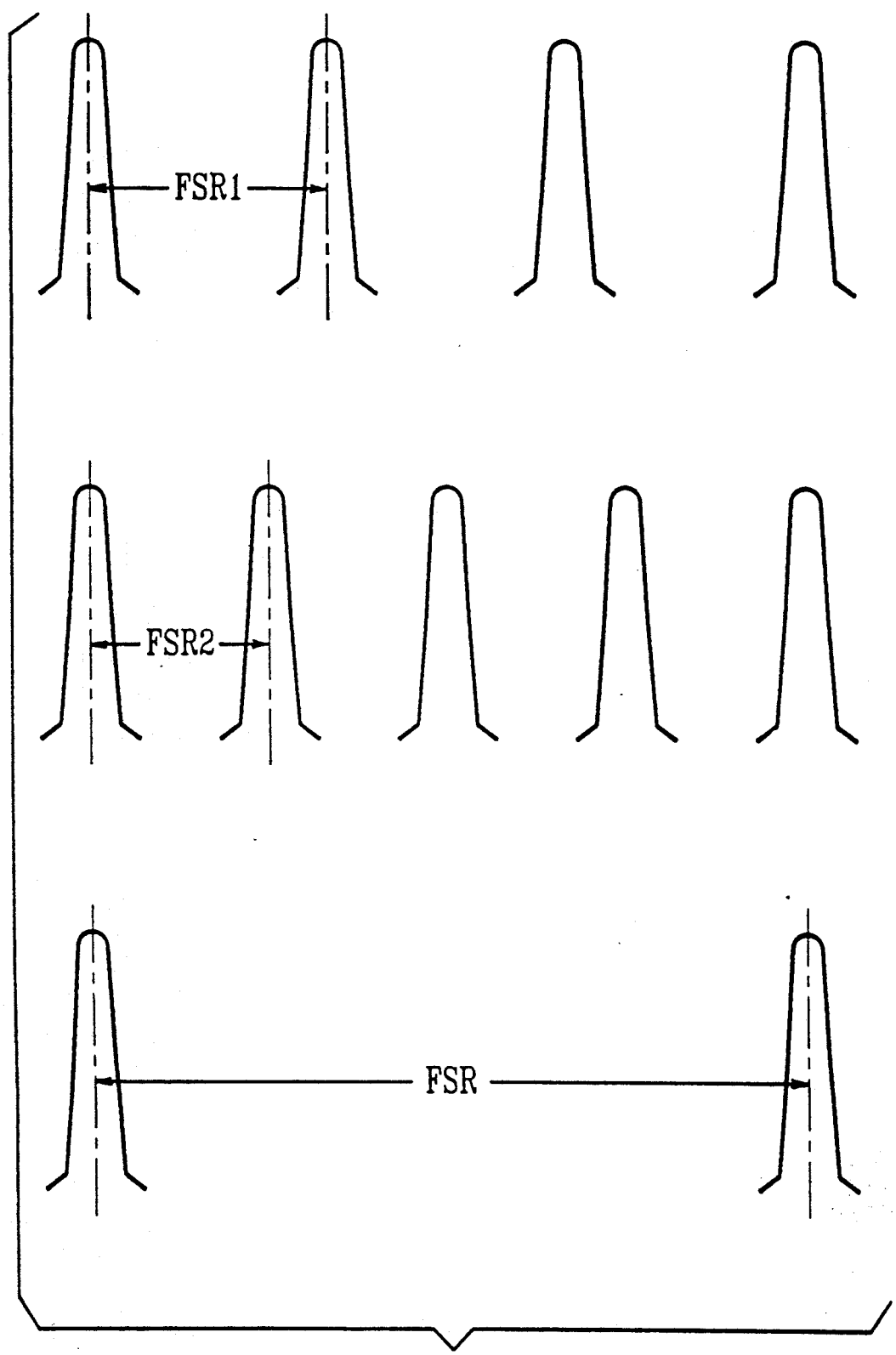
FIG. 2(c) schematically illustrates the frequency responses of each of the two individual filters and of the cascade in a cascaded vernier filter.

The filter array elements consist of waveguide Fabry-Perot filters, each having a unique cavity length. The Fabry-Perot filter has an amplitude response which is periodic in frequency; the range of frequencies between neighboring responses is called the FREE SPECTRAL RANGE (FSR). It is possible to cascade two such structures together, forming either a coarse-fine or vernier combination, as in FIG. 2(a). In this scheme, the first half comprising 110, 120, and 130, and the second half comprising 110, 120-1, and 130 are identical except for the lengths of the resonant cavities in the filter arrays 120 and 120-1. The response of the cascaded filter is the product of the responses of the individual filters. The response of the coarse-fine cascaded filter is illustrated in FIG. 2(b) and that of the vernier cascaded filter in FIG. 2(c). In these figures, FSR1 and FSR2 are the free spectral ranges of the first and second filters of the cascade.

For the coarse-fine configuration, the pass band of the coarse filter is usually made approximately equal to the FSR of the fine filter. For the vernier configuration, the free spectral ranges of the two filters, FSR1 and FSR2 respectively, obey the relation $pFSR1 = qFSR2$, where p and q are integers. The cascade's FSR is then p/(p,q)×FSR1, where (p,q) is the greatest common divisor of p and q, and its selectivity is determined by the narrower of the two filters. Usually p and q are chosen to be relatively prime so that the cascade's FSR is simply pFSR1. Further information on coarse-fine and vernier cascaded filters can be found in in "The Fabry-Perot Interferometer" by J.M. Vaughan, Adam Hilger Press, 1989.

Cascaded filters are attractive because they can resolve many more channels. If the individual filters resolve M and N channels respectively, the cascaded filter can resolve M×N channels. For a 5 stage optical binary tree switching network, incoming light can be routed to an array of 32 fixed tuned filters. If two such devices are cascaded, a total of 1,024 channels can potentially be resolved.

Figure 3B:
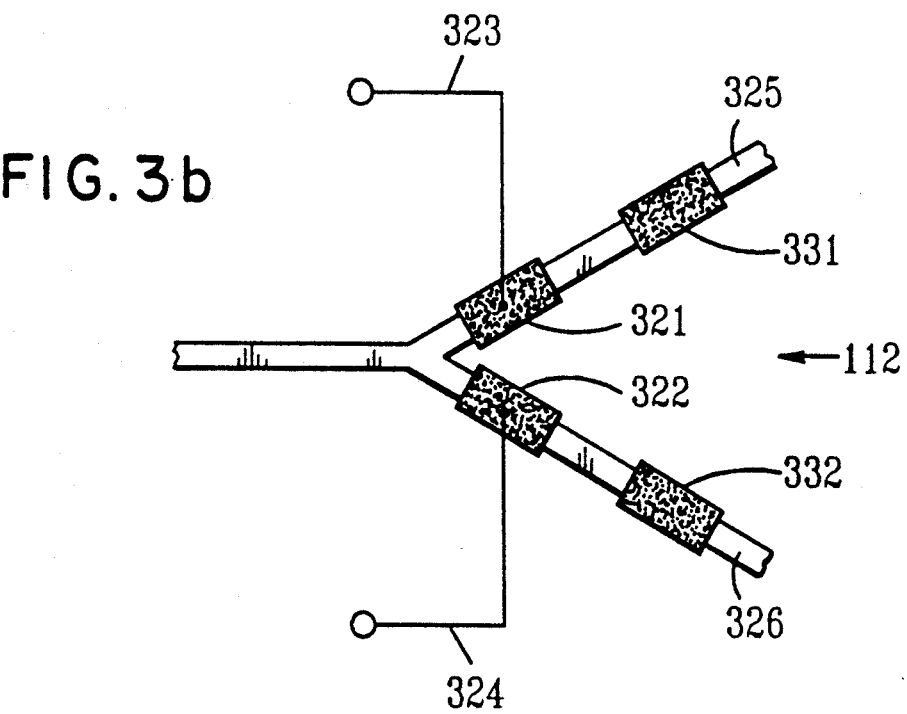
FIG. 3(b) schematically illustrates the Y-junction optical switch used in this invention with additional in-line optical amplifiers.

The preferred embodiment of the optical switch is shown in FIG. 3(a). Each optical switch 112 is constructed as a Y-junction waveguide where the optical beam at the input is switched to output 325 or 326. The switching is accomplished by injecting current into electrode 321 or 322 by means of conductors 323 and 324 respectively; this lowers the refractive index of the waveguide material and thereby reduces its optical mode confinement. As a result, if current is injected into 321, the light will be guided into output 326. As an alternative to the preferred embodiment, in-line optical amplifiers 331 and 332 can be located on the output waveguides as shown in FIG. 3(b).

A detailed explanation of the carrier induced refractive index change in the semiconductor can be found in a paper by B. Bennett, R.A. Soref, and J.A. Del Alamo in *IEEE Journal of Quantum Electronics*, vol. 26 pp. 113-122, 1990. The design and fabrication of a Y-junction semiconductor optical switch was reported by H. Yanagawa, K. Ueki and Y. Kamata in *IEEE Journal of Lightwave Technology* vol. 8 pp. 1192-1197 1990, which is herein incorporated by reference.

The above type of optical switch has several advantages.
1. There is little or no wavelength and polarization dependence. A less than 3% polarization dependence was reported by H. Yanagawa, K. Ueki and Y. Kamata in *IEEE Journal of Lightwave Technology*, vol. 8 pp. 1192-1197, 1990.
2. The typical extinction ratio for a Y-junction switch is 20 dB, since any electromagnetic radiation leaked to the wrong arm will be attenuated by free carrier absorption.
3. After reaching the condition of total internal reflection, any further decrease in optical index by injected carriers will not change the switching behavior. This threshold-like or digital-like binary characteristic can significantly simplify the control of the switch.
4. The switch length can be quite small, typically <100 μm. A 7-stage 4×4 crossbar optical switch network having a length of ≃8 mm was reported by H. Inoue et al in *IEEE Journal on Selected Areas in Communications*, vol. 6, no. 7 pp. 1262-1266, 1988.

The design of a carrier-injection switch with optical amplification was reported by H. Inoue et al in *IEEE Photonics Technology Letters*, vol. 2, no. 3 pp. 214-215, 1988.

The design and fabrication of planar waveguides is well known in the art and can be found in "Guided-Wave Optoelectronics" by T. Tamir, Springer-Verlag Series, 1988. The optical switch waveguide structure can be fabricated with the usual liquid phase epitaxy, molecular beam epitaxy, or metal-organic vapor phase epitaxy methods combined with etching and metal diffusion to form p-n junctions. The dimensions of the tree are limited by the splitting angle of the switch outputs which must be <3° to minimize loss and the waveguide separation at the leaves. It was shown by C.S. Li in his PhD thesis, University of California at Berkeley, 1991, that a waveguide separation of at least 8 μm is required for the crosstalk to be 30 dB below the signal. In his calculation, a single mode waveguide with an optical index of 1.5 and a difference in index of 0.04 between the waveguide and the cladding were assumed. The waveguides had a width of 3 μm and a length of 50 μm.

Because the switches are non-ideal, some of the light will be routed to fixed tuned filters which select undesired wavelengths. If a fraction A is switched to the desired arm and 1−A leaked to the undesired arm, then for a maximum crosstalk penalty of 20 dB, A must be >0.95.

Figure 4A:
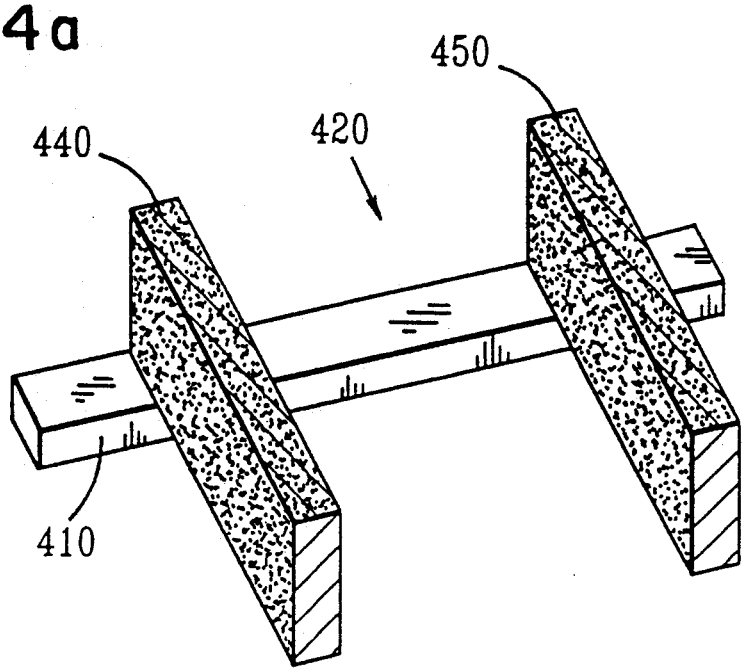
FIG. 4(a) schematically illustrates the fixed tuned filter used in this invention.
Figure 4B:
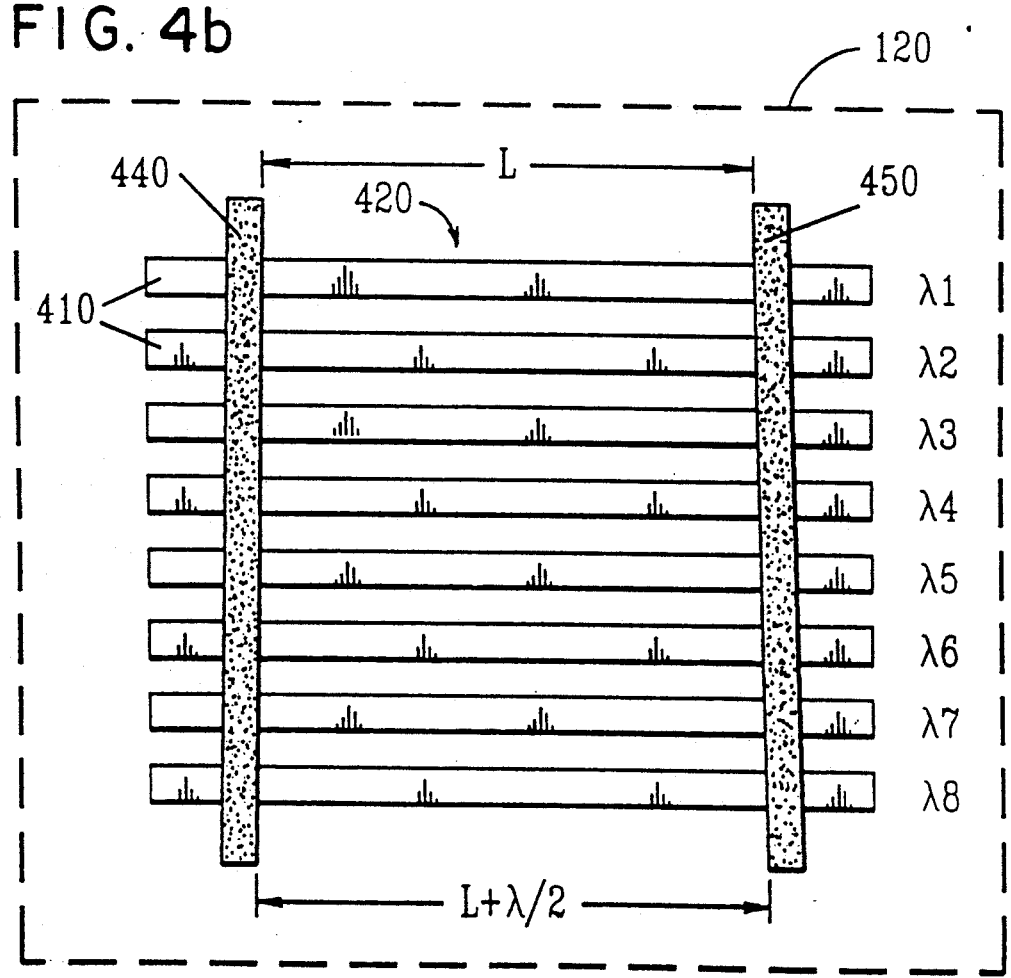
FIG. 4(b) schematically illustrates the array of fixed tuned filters used in this invention.

A preferred embodiment of the Fabry-Perot filter which is amenable to monolithic fabrication is shown in FIG. 4(a). Light is coupled into waveguide 410 and then propagates into a resonant cavity formed by mirrors 440 and 450 at the ends of waveguide 420. The mirrors are formed by vapor deposition of gold into a narrow trench (width ≃1 μm and depth ≃4 μm) in the substrate to yield a reflectivity exceeding 96%. Since the substrate, InGaAsP/InP waveguide has low loss (≃1 dB/cm), a filter finesse of ≃70 can be attained. The waveguide cross-section is approximately 1 μm deep by 3 μm wide. The filters are constructed into an array 120 as illustrated in FIG. 4(b). The spacing between neighboring filters is ≃20 μm and the length, L, of the shortest cavity depends on its FSR and is $\simeq \lambda^2/2nFSR$, where n is the effective refractive index of the waveguide and λ is the wavelength at which it resonates. The difference in optical length between neighboring cavities is λ/2N, where N is the number of channels. The two gold filled trenches 440, 450 forming the mirrors are fabricated by reactive ion etching and E-beam lithography.

Figure 5A:
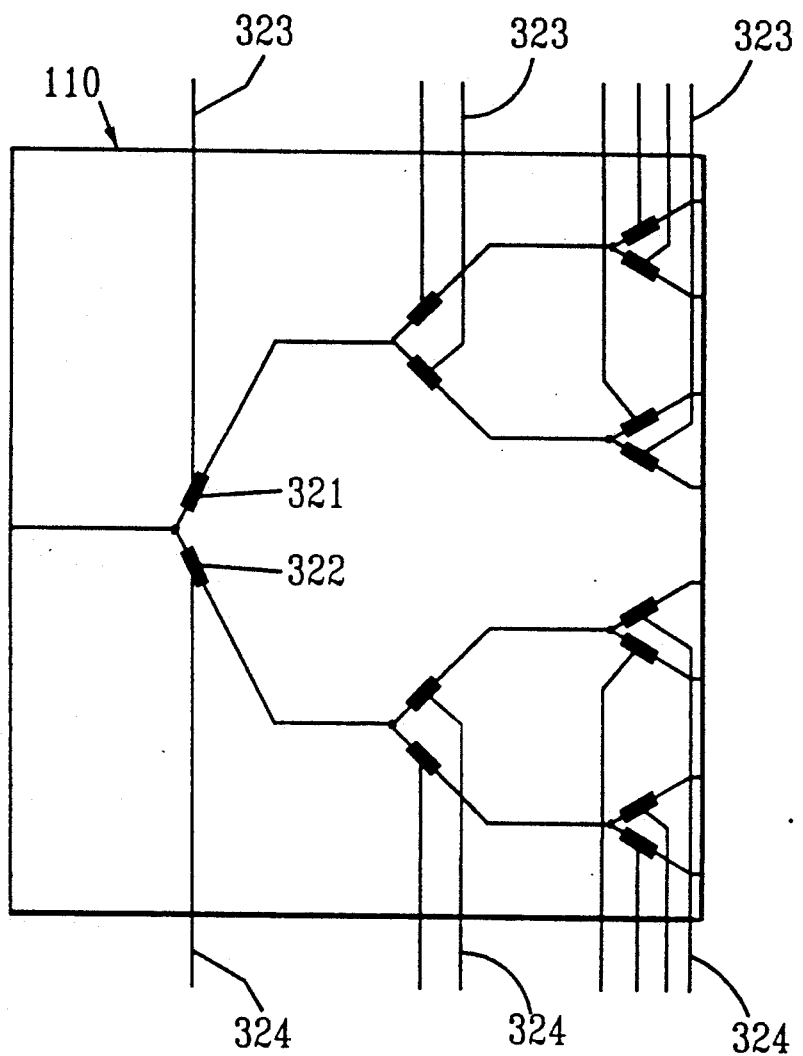
FIG. 5(a) schematically illustrates the means for electronically controlling the state of optical switches in a tree configuration.

Each switch in the tree 110 can be individually controlled as shown in FIG. 5(a) by connecting separate conductors 323, 324 to each electrode 321, 322 respectively. The two states of the switch correspond to current being injected into electrode 321 or electrode 322.

Figure 5B:
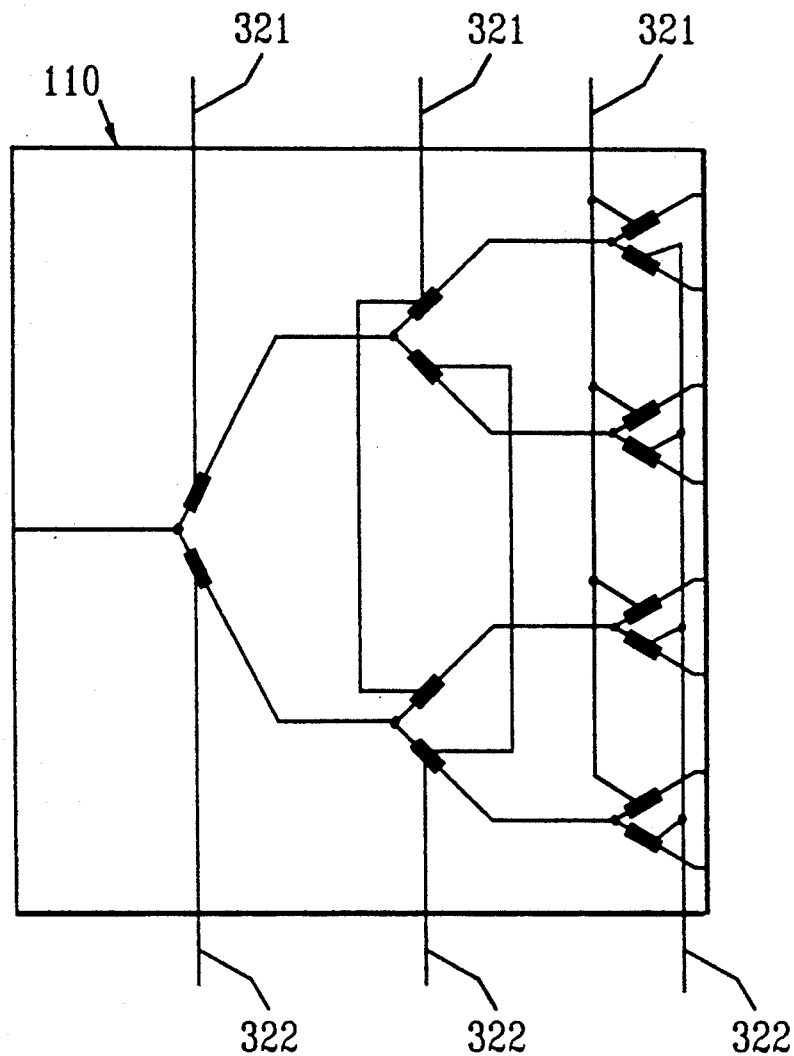
FIG. 5(b) schematically illustrates a simplified means for controlling the state of optical switches in a tree configuration.

Since only one route needs to be set up in the tree, the control for all switches in a given stage can be common as shown in FIG. 5(b), i.e., current is injected into either ALL the upper electrodes 321 or ALL the lower electrodes 322 of the switches in a given stage of the tree. Because of the substantial saving in control signals, this latter scheme is the one adopted for the preferred embodiment.

Having thus described our invention, what we claim as new and desire to secure by Letters Patents is:

1. A tunable optical filter comprising:
   a. an array of fixed tuned optical filters; and
   b. a plurality of optical switches for spatially directing an optical beam, said switches being optically interconnected by waveguides, with each of said waveguides having an optical amplifier, with said beam being directed through a number of said switches and their interconnecting waveguides to a selected filter in said array so as to obtain a selected optical wavelength.

2. An apparatus as recited in claim 1, wherein said plurality of optical switches are arranged in a tree structure, with each of said optical switches having means, responsive to a respective binary signal, for spatially directing said optical beam to either of two outputs of said each optical switch, with the outputs of said switches in the last stage of said tree corresponding to leaves of said tree with each leaf of said leaves coupled to one of said fixed tuned optical filters in said array.

3. A tunable optical filter comprising:
a. an array of fixed tuned optical filters; and
b. a plurality of optical switches interconnected by waveguides for spatially directing an optical beam to a selected filter of said array, with each optical switch having means, responsive to a binary signal, for spatially direction said beam to either of two outputs of said each optical switch, said optical switches being arranged in a tree structure with said two outputs of each optical switch in the last stage of said tree corresponding to leaves of said tree with each of said leaves coupled to one of said fixed tuned optical filters in said array, with said optical beam being directed through one of said two outputs for each of a number of said optical switches in response to each binary signal for each of said number of optical switches, said beam being directed to one of said leaves coupled to said selected filter which resonates at a selected optical wavelength.

4. A method of providing a selected optical wavelength from an optical beam, said method comprising:
a. directing said optical beam through a tree structure of optical switches, interconnected by waveguides, by controlling the state of a number of binary signals, with each of said binary signals being used to direct said optical beam through one of two outputs of one or more of said number of optical switches, with said beam being directed to a leaf of said tree which leaf is coupled to a fixed tuned filter in an array of fixed tuned filters with said fixed tuned filter resonating at said selected wavelength.

5. A tunable optical filter comprising:
a. an array of fixed tuned Fabry-Perot filters, each of which is resonant at a unique wavelength; and
b. a plurality of optical switches for spatially directing an optical beam, said switches being optically interconnected by waveguides, with said beam being directed through a number of said switches and their interconnecting waveguides to a selected filter in said array so as to obtain a selected optical wavelength.

6. A tunable optical filter comprising:
a. an array of fixed tuned optical filters; and
b. a plurality of optical switches for spatially directing an optical beam, with said switches being optically interconnected by waveguides, with said beam being directed through a number of said switches and their interconnecting waveguides to a selected filter in said array so as to obtain a selected optical wavelength, with each of said optical switches comprising means, responsive to a binary signal, for spatially directing said beam in either of two directions, with each state of said binary signal indicated which one of said two directions said beam is to be directed after passing through said each switch.

7. An apparatus as recited in claim 6, further comprising:
a reverse tree of optical switches for spatially directing said beam from said selected filter to the root of said reverse tree with said root being the output of said tunable optical filter.

8. An apparatus as recited in claim 6, further comprising:
a lens for directing said beam from said selected filter to the output of said tunable optical filter.

9. A tunable optical filter comprising:
a. an array of fixed tuned optical filters; and
b. a plurality of optical switches interconnected by waveguides for spatially directing an optical beam to a selected filter of said array, with each of said optical switches having means for spatially directing said beam to one of a plurality of outputs of said each switch, said optical switches being arranged in a tree structure with the outputs of each optical switch either connected to the input of another optical switch or to the input of a fixed tuned optical filter.

* * * * *